Jan. 2, 1945.  E. F. BURTON ET AL  2,366,382
CONTROL SURFACE BOOST DEVICE AND GUST DAMPENER
Filed March 28, 1939  2 Sheets-Sheet 1
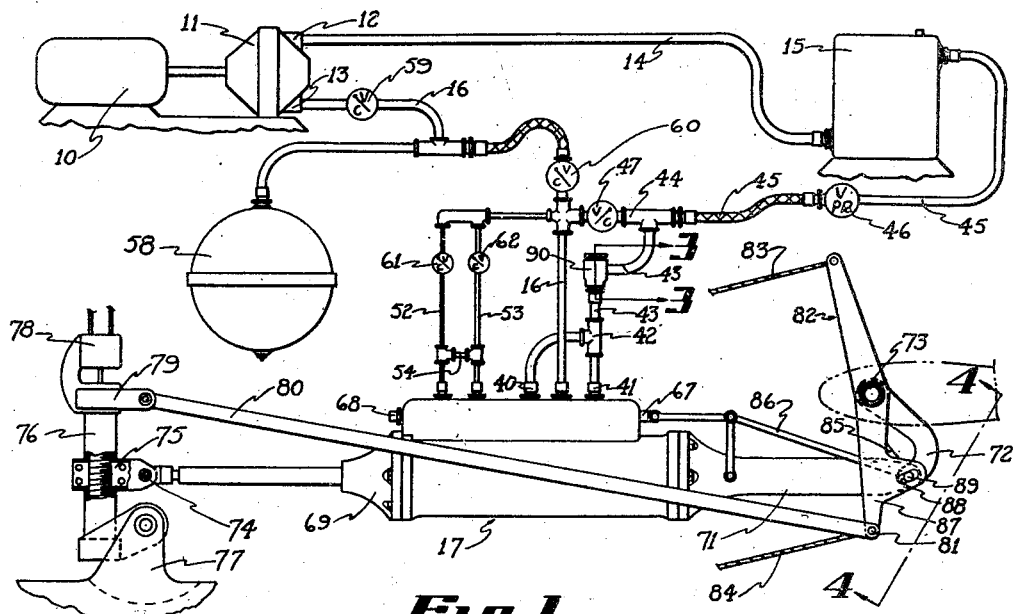
Fig. 1
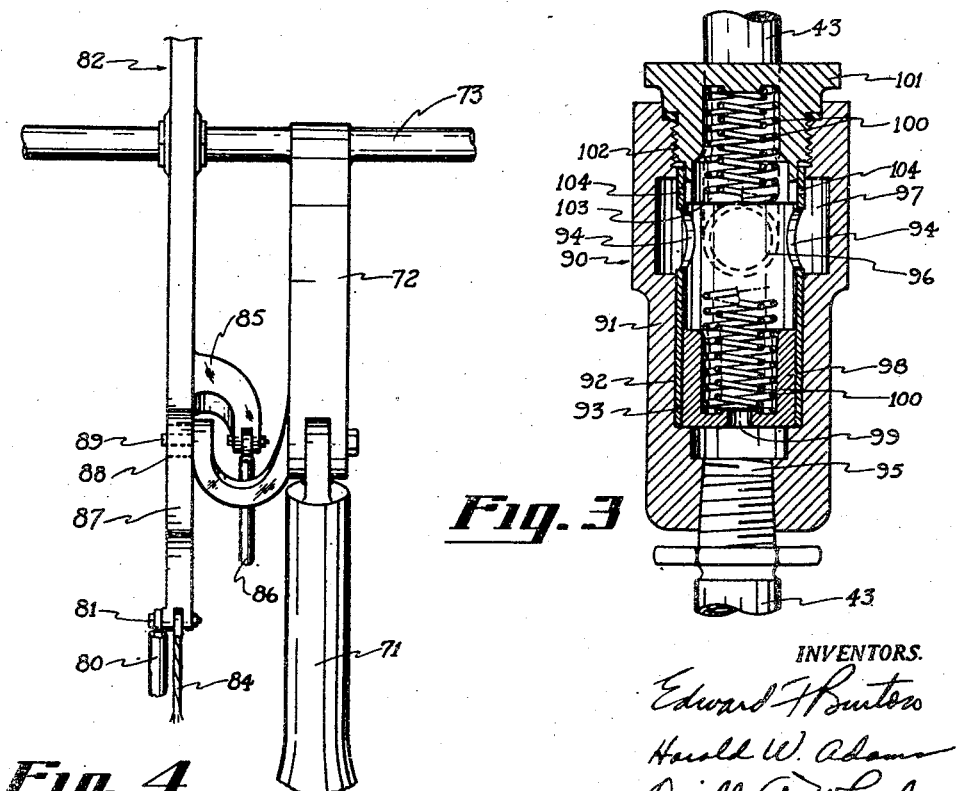
Fig. 3
Fig. 4
INVENTORS.
Edward F. Burton
Harold W. Adams
Orville A. Wheeler

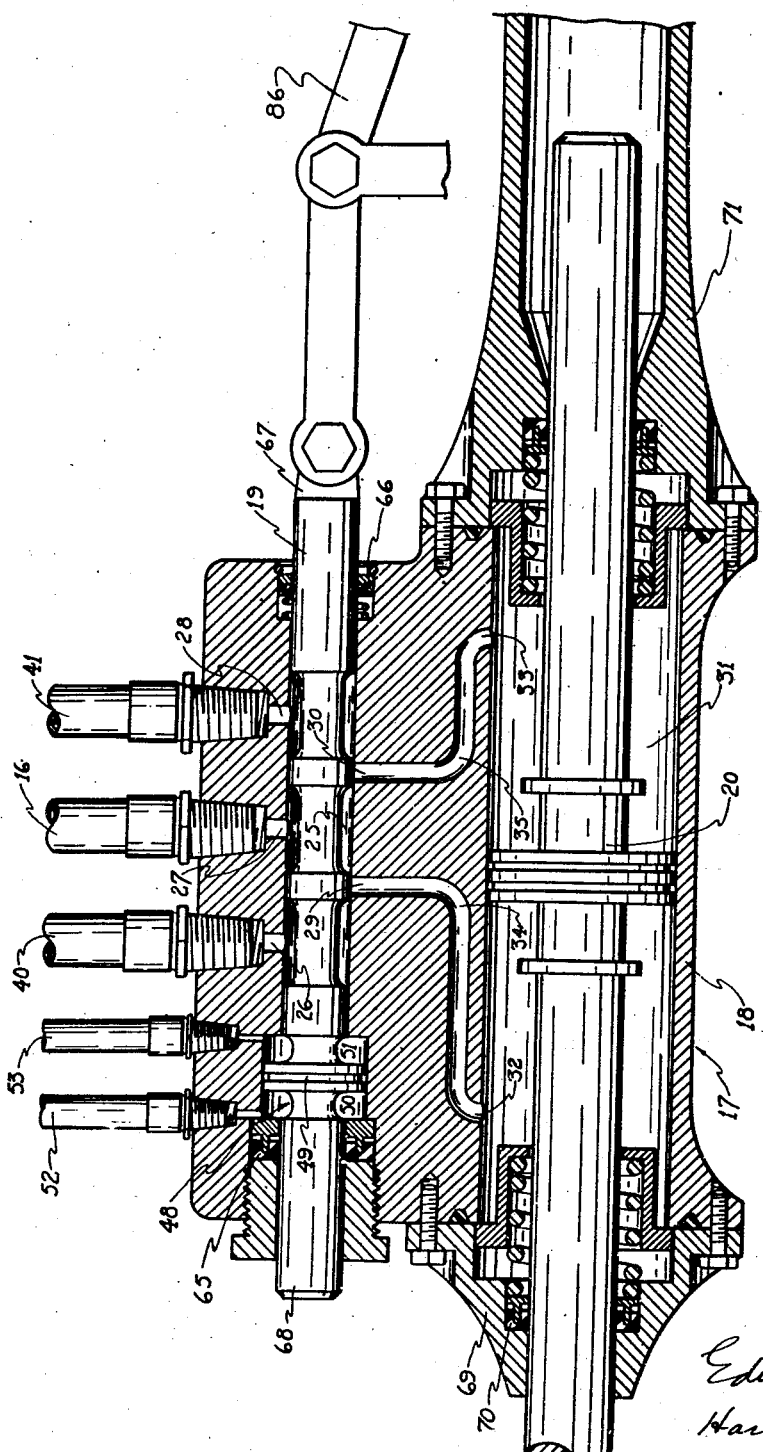

Patented Jan. 2, 1945

2,366,382

UNITED STATES PATENT OFFICE 2,366,382

CONTROL SURFACE BOOST DEVICE AND GUST DAMPENER

Edward F. Burton, Los Angeles, Harold W. Adams, Santa Monica, and Orville A. Wheelon, Pacific Palisades, Calif., assignors to Douglas Aircraft Company, Incorporated, Santa Monica, Calif.

Application March 28, 1939, Serial No. 264,544

19 Claims. (Cl. 244—85)

REISSUED
MAR 5 - 1946

Our invention relates to improvements in aircraft surface controls with particular reference to a hydro-mechanical booster mechanism for actuating the control surfaces and thereby relieving the pilot by decreasing the manual effort necessarily expended for such actuation, particularly on large airplanes. The invention also incorporates a gust dampening feature wherein the engine or booster prevents violent and sudden gusts from rapidly actuating and possibly damaging the control surfaces while the airplane is on the ground or from suddenly actuating and possibly wrenching the controls from the pilot's hands while in flight.

We are conversant with methods and apparatus in use to date for accomplishing both control surface boost and control surface gust dampening but such methods and apparatus including conventional valve controlled hydraulic servo units, automatic pilot remote controls, booster flaps, aerodynamically balanced surfaces, locking clamps and locking pins are not generally satisfactory due to certain undesirable features. First, the hydraulic servo units which are controlled by a conventional valve provide no follow up or load feel; returning this valve to neutral merely allows a surface so controlled to remain in the displaced position. Second, the automatic pilot remote control units do not operate from the manual controls, do not provide load feel and do not afford a sufficiently convenient and rapid control for use during takeoff or landing. Third, the booster flaps on the control surfaces serve the general purpose of reducing the pilot's effort, but are undesirable from the standpoint of their tendency to decrease the natural stability of an airplane. Fourth, aerodynamically balanced surfaces have contributed greatly to control force reduction but with the ever increasing size of aircraft, the forces have also increased to the point of becoming unwieldy and fatiguing in operation.

Gust dampeners or locks which are generally used while an airplane is at rest consist either of clamps placed partially on the movable control surface and partially on the adjacent fixed surface or of a sliding pin lock arrangement releasable from the cockpit. Both of these methods, while they effectively prevent wind gusts from displacing the surfaces of an airplane on the ground, cannot be used while the airplane is in flight. In fact, their use on the ground presents an extremely dangerous possibility in that they may be inadvertently left in place at takeoff, thereby rendering useless the controls to which they are attached. Even the sliding pin lock, although controllable from the cockpit, is often not releasable when the control surface is under load as it would be under take-off and flying conditions. Use of these locks is doubly dangerous in large airplanes where the surface is distant from the controls because even though the pilot should flex the cockpit controls as a check before take-off, there is usually sufficient deflection in the control cables and supporting structure to allow cockpit control movement without indicating that the surfaces proper are locked.

The principal object of the invention is to provide an aircraft surface control system wherein the force required to move the cockpit controls a given amount is proportionately less than the force necessary to actuate the control surface a corresponding amount.

Other objects are: to provide a hydro-mechanical control surface booster which can be used to reduce control forces under all flight conditions; to provide a hydro-mechanical control surface booster which affords a positive coordination between the cockpit control and the control surface; and to provide a hydro-mechanical control surface booster which will transmit load feel to the cockpit controls.

Still further objects are to provide a hydro-mechanical control surface booster which will lessen the fatiguing duties of air transport pilots; to provide a hydro-mechanical control surface booster wherein the ratio of force applied at the control surface to the force applied at the cockpit controls can be varied between a predetermined minimum and infinity; to provide a hydro-mechanical control surface booster which can be utilized in combination with an automatic pilot; to provide a control surface dampener which effectively prevents sudden gusts from rapidly actuating the surfaces both on the ground and in the air; and to provide a control surface gust dampener which, while preventing sudden gusts from rapidly actuating the surfaces, permits free controllability by the pilot.

Another object of our invention is to provide a control surface gust dampener which operates at the surface rather than transmitting loads through the control system.

Other and further objects will become apparent as the description proceeds.

In the accompanying drawings:

Figure 1 is a schematic diagram showing the control surface boost and gust dampening system.

Figure 2 is a sectional elevation of the control surface boost and gust dampening valve and piston unit.

Figure 3 is a sectional view of the hydraulic snubber unit taken on line 3—3 of Figure 1; and Figure 4 is a view of a portion of the linkage mechanism taken on line 4—4 of Figure 1.

A system incorporating our control surface boost and gust dampening mechanism is shown in Figure 1, the numeral 10 indicating an electric or hydraulic motor or other power supply which drive a pump 11 having an intake port 12 and a pressure port 13. Port 12 of the pump is connected by a line 14 to a fluid supply such as a reservoir 15, and port 13 is connected by a line 16 to a valve and piston unit 17.

The unit, shown in detail in Figure 2, includes a body 18 which houses a shuttle valve 19 and a piston 20. Valve 19 reciprocates in a valve chamber 25 having a plurality of ports 26—27—28—29—30, port 27 communicating with the line 16. Piston 20 reciprocates in a cylinder 31 having ports 32—33, port 32 communicating through a passage 34 with valve port 29, and port 33 communicating through a passage 35 with valve port 30. Valve ports 26—28 are connected by lines 40—41 at 42, from which point a line 43, incorporating a snubber cylinder 90, continues to a T 44. From this T a line 45 incorporating a pressure relief valve 46 returns to reservoir 15, and a line incorporating a check valve 47 connects into line 16.

A dash pot 48 is provided at the end of valve chamber 25, and the portion of valve 19 which rides in the dash pot includes a piston head 49. Head 49 divides the dash pot into two portions 50—51, portion 50 being connected back to line 16 by a line 52, and portion 51 being connected to line 16 by a line 53. Also, the dash pot portions are interconnected by a restricted line 54 to afford a retarded interflow of fluid from one dash pot portion to the other.

Snubber cylinder 90 is connected into line 43 and acts as a constant speed control of fluid flow through the system. The cylinder comprises a housing 91 having a bore 92 into which a cage type sleeve 93 with openings 94 is pressed. An inlet port 95 is provided in the bottom of the housing and leads to bore 92. An outlet port 96 is provided in the side of the housing approximately intermediate the ends and connects with an annular recess 97 within the housing and concentric with the bore 92. The sleeve is so arranged within the the housing that its openings 94 connect with the annular recess in a transverse relation to the outlet port 96. A piston 98 is mounted in the bore 92 and has a metering orifice 99 which is adapted to create a pressure drop in the cylinder. The piston is held at the bottom of the bore by springs 100 until fluid entering port 95 confronts the piston, creates pressure by reason of the metering orifice and forces the piston upward against the spring thereby closing the openings in the sleeve. The springs are retained by the piston and a cap 101 threaded into the cylinder housing at 102. This cap also secures the sleeve in place and has three prongs 103 which extend into the annular recess and serve as a stop for the piston. Two small holes 104 are provided in the sleeve just above the openings 94 and these holes also are within the area of the annular recess; however, they are located sufficiently high that they cannot be shut off by the piston as it is stopped by the prongs of the cap at the upper end of the travel, the prongs being arranged to allow an interflow of fluid.

A pressure tank 58 is provided in line 16. The tank acts as a pressure governor in that it prevents surges and pressure fluctuations and assures a constant supply of pressure to the system so long as the pump is operative.

Numerous check valves are provided in the system as a precaution against leakage or line failure. For example, a valve 59 is located between the pump and the pressure tank; a valve 60 assures the presence of fluid in the shuttle valve and dash pot system in the event of leakage in the pressure tank or line between valves 59 and 60; and fluid is further retained in the dash pot by valves 61—62, located respectively in lines 52—53.

The shuttle valve 19 extends at each end from housing 18 and is sealed against fluid leakage by packing glands 65—66. End 67 of the valve is adapted for the attachment of an operating linkage and end 68 merely moves to and from the housing as the valve reciprocates.

Piston 20 extends from the housing at one end and is sealed by a head assembly 69 incorporating a packing 70. At the other end, a hollow elongated head assembly 71 seals the piston and houses it throughout its travel.

The unit 17 is supported at one end by head assembly 71 attached to a torque arm 72 which is in turn fixed to a control surface torque tube 73, and at the other end by the piston 20 pivotally connected at 74 to a threaded collar 75. The collar is adapted to move on a worm type lever 76, swingably connected to a fixed structure bracket 77, in response to rotation of the worm by an electric or hydraulic motor 78, or cable drive. A stationary collar 79 is provided at the upper end of lever 76 and affords a pivotal connection for a rod 80 extending rightwardly and attaching at 81 to a bellcrank 82. The bellcrank is pivotally carried by the control surface torque tube and performs the conventional functions, having control cables 83—84 attached to each main arm and extending to the pilot's controls. However, the bellcrank is of special design adapted to cooperate with the booster mechanism in that an auxiliary arm 85 is provided for connection with the shuttle valve operating linkage 86. The lower main arm 87 of the bellcrank is slotted at 88 in a manner suitable to receive a pin 89, the pin being bracketed to the torque arm 72 which supports the piston head assembly 71, and is fixed to the control surface torque tube.

The operation of our control surface boost and gust dampending system will now be described:

With the system filled with fluid, the power supply 10 driving pump 11 keeps the oil circulating under pressure, the fluid being drawn from reservoir 15 through line 14 and expelled under pressure from pump port 13 into line 16. Check valve 59 prevents fluid from returning to the pump in the event of a failure ahead of the valve. Pressure tank 58, being of the oil and air chamber type with a flexible diaphragm, as disclosed in our copending application, Serial No. 308,414, is connected into line 16 and serves to assure a constant pressure in the system and surges by absorbing them through the flexible diaphragm.

Pressure is now available in the dash pot 48 by reason of its connection with line 16, and at the shuttle valve into which line 16 directly connects.

As the control cables 83—84 are actuated, the bell-crank 82 is pivoted about the control surface torque tube 73 until one end of slot 88, depending upon the direction of motion, contacts the pin 89 attached to torque arm 72. This pivotal motion of the bellcrank also actuates the linkage 86 which controls the movement of the shuttle valve. The mechanism is so arranged that the valve is closed when the pin is in the center of the slot and is fully open when either end of the slot and the pin are in contact. The direction in which the valve is open depends upon the slot end with which the pin is in contact.

For example, when the pilot pulls on cable 83, the bellcrank rotates about the control surface torque tube in an anti-clockwise direction. This motion displaces the shuttle valve which begins to connect pressure port 27 with passage 35 leading to the right side of the piston chamber. Simultaneously, the slot is being moved rightwardly relative to the pin until the forward slot end and the pin are in contact, at which time the valve is fully open.

Pressure acting on the piston displaces it in a leftwardly direction and, as the valve and piston unit 17 floats between the pivotal lever 76 and the torque arm 72, force is exerted on both the lever and the torque arm. The force acting on the torque arm rotates the control surface anti-clockwise and the force acting on the lever moves it leftward in an arcuate path. This lever moving leftward also actuates the rod 80 in a leftward direction and the rod, by its connection to bellcrank 82 tries to rotate the bellcrank in a clockwise direction against the opposite force being exerted by the pilot.

It may be seen then that the piston forcing the torque arm 72 rightward in an arcuate motion and the rod 80 leftward would tend to move the slot and pin relative to each other in opposite directions until the pin is centered in the slot and the valve closed, whereupon the pressure is shut off and the piston halted.

The effort required of the pilot then must be sufficient to overcome the force being exerted through the rod 80, which would be the power required to prevent the pin from moving to the center of the slot as the piston moves the torque arm rightward. In other words, the pilot must resist the force of the rod 80 and keep the slot in the same relation to the pin as it was when he first pulled on the cable and opened the valve, otherwise, the piston moving the torque arm, to which the pin is attached, will close the valve and stop the pressure movement.

The pilot is able to resist the force of rod 80 due to the leverage relation of the connections between the bellcrank and the rod 80, the rod 80 and the pivotal lever 76, and the pivotal lever 76 and the piston 20. This leverage is such that the force exerted by the pilot is a sub-multiple of the force required to operate the surface. Otherwise stated, the pilot constantly pulling on the control cable is constantly moving the slot so that the pin is off-center, and the piston is constantly trying to center the pin thereby moving the control surface. The force exerted by the pilot is multiplied at, for instance, a ratio of 5:1 so that when he moves his controls ten inches with a force of twenty pounds, the piston and linkage will move the control surface ten inches with a force of one hundred pounds. If only a ten pound force is required to move the control surface, only a two pound exertion will be required of the pilot.

The present preferred ratio between the force required to move the control surface and the force applied by the pilot is 5:1 and this ratio is obtained by setting the threaded collar 75, to which piston 20 is attached, at a certain location on the worm type lever 76. In the preferred embodiment this 5:1 location is obtained at the upper end of the threaded collar's travel on the worm. This then is the predetermined minimum and the ratio may be increased to infinity by bringing the collar down on the worm to the lower end of the travel, which position corresponds to the dead center location between the piston and the lever 76.

Load feel is transmitted to the pilot through his necessary effort to overcome the force of rod 80 as previously described, this effort being a sub-multiple or one fifth the load present at the surface.

Returning now to the displacement of piston 20: As the pressure enters through passage 35, the fluid present on the other side of the piston is forced out through passage 34, through the valve chamber and into return line 40 via port 26. Line 40 connects with return line 43 which incorporates the snubber cylinder 90. The orifice 99 in the spring loaded piston 98 of this snubber retards the return flow of fluid which causes pressure to build up until the spring is compressed. Piston 98 then rises until it strikes a stop, at which location it closes the outlet port in the snubber halting all but the slightest flow of return fluid. Halting the flow in this manner causes pressure to build up in the exhausting side of the piston 20 and consequently slows down the operation of the system. With the snubber piston in the uppermost end of its travel, the fluid flows through the orifice 99 until pressure plus the power of the spring is sufficient to return the piston downward, opening the ports in the sleeve 93 so that fluid can continue its return flow through line 43 and back to the reservoir. In the event anything happens such as spring breakage, etc., to prevent the snubber piston returning from its shut off position, small holes 104 are provided in the sleeve just above the large openings 94. These small holes are located high enough to prevent their being closed by the piston, so they will always allow a small amount of fluid to exit through port 96 in the snubber cylinder.

This snubber is in effect a governor controlling the speed with which the boost system can be operated and, while it permits operation rapidly enough from a standpoint of controlling the surface, it prevents wind gusts from suddenly actuating the surface thereby possibly causing damage.

The operation of the system as described thus far has been with respect to the pilot exerting force on cable 83 to obtain an anti-clockwise movement of the control surface. In obtaining a clockwise movement, cable 84 is pulled and the valve is opened in the same manner as previously described. Also the relative movement of the pin and the slot is the same except that the opposite end of the slot is brought into contact with the pin, and the valve is moved in the leftward direction. This connects pressure port 16 with passage 34 and the fluid forces the piston rightward thereby pulling the control surface torque arm 72 and the pivotal lever 76 towards one another. This is possible because the piston rod is allowed to move into the hollow elongated head assembly 71 of the valve and piston unit 17. The lever and rod linkage operates to obtain the same result as heretofore except that the rod 80 is now pushing against the pilot instead of pulling.

The snubber operation for each movement is identical as both return lines 40—41 are teed into the snubber cylinder.

An important feature of the invention is that when the member 75, Fig. 1, which is connected to the lever 72 of the airfoil through the motor or power means 17, is moved a short distance by the pilot, the power means 17 operates to add a supplementary movement to the movement of the part 75 so that the displacement of the lower end of the lever 72 includes the small movement of the part 75 and the larger supplementary movement of the cylinder and extension 71 of the power means 17. For example, if the part 75 is moved to the right a distance D, the power means 17 will be actuated so as to shift the body 18 and the extension 71 rightward relatively to the piston 20 through a distance $nD$. Since the piston 20 is directly connected to the part 75, the rightward movement of the part 75 will move the piston 20 rightward, and to this movement of the piston 20 will be added the supplementary movement of the body 18 and the extension 71 in rightward direction so that the member 71 will move the lower end of the lever 72 through a distance which is the summation of the movements of the part 75 and of the body 18, or $D+nD$. Disregarding friction, whatever force the pilot or operator must apply in order to move the member 75 depends upon the reaction of the airfoil against movement, exerted through the lever 72. It will be perceived that through the linkages described, the reaction of the airfoil and wind loads thereon is constantly transmitted back to the pilot, and that whenever he transmits to the airfoil a small movement through movement of the member 75, the power means 17 will act to add to this small movement a larger supplementary movement without interfering with the load feel which is carried back through the linkages to the hand of the pilot.

The gust dampening feature of the invention, in addition to the snubber cylinder action, operates on the reduced load principle and it may be readily seen that sudden gusts will have little effect upon the pilot's control in flight by the time the gust power has been divided by five. The sudden action is still further damped by the shuttle valve dash pot 48 which exerts a drag or snubbing effect on the valve movement. When the airplane is to be parked on the ground, the effectiveness of the dampening action can be enhanced by moving the threaded collar 75 to the lower end of its travel which increases the ratio between the surface and the pilot's control from 5:1 to infinity.

The means for gust dampening is also effective during the time the hydraulic system is for any reason inoperative. For example, should the pressure supply in the hydraulic system be discontinued, as for example by stopping of the pump 11 or rupture of piping 16 or the reservoir 58, the check valve 60 will prevent a reverse flow upward from the cross-fitting to which check valve 60 is connected and loss of fluid from the flexible conduit 45 into the rigid conduit leading to the reservoir 15 will be prevented by the pressure release valve 46 which may be set so that fluid will not pass therethrough until a reasonable pressure, for example, ten or twenty pounds, is applied to the fluid. The movement of the fulcrum lever 82, under this condition, will be transmitted directly through the pin 89 to the lever 72, thereby directly moving the airfoil. Movement of the fulcrum lever 82 will be transmitted through the link 80 to the lever 76, with the result that there will be an elongation and contraction of the hydraulic device 17 as the fulcrum lever 82 is rotated respectively in counterclockwise and clockwise direction. The resultant movement of the piston 20 in the cylindrical body 18 will result in a movement of hydraulic fluid outward through either pipe 40 or 41, depending upon the direction of movement of the piston 20. In view of the fact that the outward flow of fluid through either pipe 40 or 41 must pass through the snubber cylinder 90, such discharge flow of fluid is constantly under the control of the snubbing device incorporated in the cylinder 90, and therefore the movement of the piston 20 within its cylinder is at all times limited, with the result that the hydraulic unit 17 at all times controls the velocity of movement of the fulcrum lever 82 and of the airfoil, and even though the pilot were applying no force to the fulcrum 82, an external force applied to the airfoil can not throw the airfoil and the operating parts connected thereto abruptly into one extreme position or the other. An important feature of the present invention is the dual cotnrol of the airfoil, providing a highly desirable safety factor. The pin 89 is constantly positioned within the slot 88 of the lever 82, so that in the event of failure of the hydraulic system movement of the airfoil may be accomplished by the direct connection of the fulcrum lever 82 through the pin 89 with the lever 72 associated with the airfoil.

The preferred embodiment operates under 800 pounds per square inch pressure but this of course may be varied to suit the particular installation requirement.

While we have described our invention in detail in its present preferred embodiment, it will be obvious to those skilled in the art, after understanding the invention, that various changes and modifications may be made therein without departing from the spirit or scope thereof. We aim in the appended claims to cover all such modifications and changes.

We claim:

1. In an airplane control system including a movable airfoil, manually operable means for controlling the said airfoil, and hydraulic and linkage means for multiplying the manual energy and transmitting load feel to the said manual means, the second said means comprising a pivotal lever spaced from said movable airfoil and a hydraulic valve and piston unit floatingly suspended therebetween, a linkage connecting said manual means with the valve and a rod connecting said manual means with said pivotal lever, whereby operation of said manual means reciprocates the said valve thereby directing pressure fluid to the said piston which is displaced and transmits force both to the airfoil and the pivotal lever, the force to the airfoil rotating same and the force to the lever transmitting load feel to the manual means in a sub-multiple of the load required to actuate the said airfoil.

2. In an airplane control system including a movable airfoil, manually operable means for controlling the said airfoil, and hydraulic and linkage means for multiplying the energy exerted by the said manual means, the second said means comprising a pivotal lever spaced from said movable airfoil and a hydraulic valve and piston unit suspended therebetween, a linkage connecting said manual means, the valve and the pivotal lever whereby operation of said manual means reciprocates the said valve thereby directing pressure fluid to the said piston which is displaced and transmits force both to the airfoil and the pivotal lever, the force to the airfoil rotating same and the force to the pivotal lever being transmitted to the said linkage, the arrangement of the said linkage being such that the force transmitted thereto is a sub-multiple of the force rotating the airfoil.

3. In an airplane control system including a movable airfoil, manually operable means for controlling the said airfoil, and hydraulic and linkage means for multiplying the manual energy and transmitting load feel to the said manual means, the second said means comprising a pivotal lever spaced from said movable airfoil and a hydraulic valve and piston unit floatingly supported therebetween, a linkage connecting said manual means with the valve and a rod connecting said manual means with said pivotal lever, said lever being so organized and arranged that the position of the said valve and piston unit may be changed with relation to the position of the rod thereby varying the multiple of the energy exerted by the hydraulic and linkage means relative to the energy exerted by the manual means.

4. In an airplane control system including a movable airfoil, manually operable means for controlling the said airfoil, and hydraulic and linkage means for multiplying the energy exerted by the said manual means, the second said means comprising a pivotal lever spaced from said movable airfoil and a hydraulic valve and piston unit floatingly suspended therebetween, a linkage connecting said manual means, the valve, and the pivotal lever whereby operation of said manual means reciprocates the said valve thereby directing pressure fluid to the said piston which is displaced and transmits force both to the airfoil and the pivotal lever, the force to the airfoil rotating same and the force to the pivotal lever being transmitted to the said linkage, the arrangement of the linkage being such that the force transmitted thereto is a sub-multiple of the force rotating the airfoil, and means for adjusting one portion of the linkage relative to another portion whereby the multiple of the force may be varied.

5. In an airplane control system including a movable airfoil, manually operable means for controlling the said airfoil, and hydraulic and linkage means for multiplying the manual energy and for governing the speed of control, the second said means comprising a pivotal lever spaced from said movable airfoil and a hydraulic valve, piston, and snubber unit floatingly suspended therebetween, a linkage connecting said manual means with the valve and a rod connecting said manual means with said pivotal lever, whereby operation of said manual means reciprocates the said valve, thereby directing fluid pressure from a fluid supply to the said piston which is displaced and transmits force to the airfoil consequently rotating same, the linkage arrangement being such that the energy required to actuate the said valve is a sub-multiple of the energy required to rotate said airfoil, and the speed of such rotation being governed by the passage of fluid from the piston as same is displaced, said fluid flowing through the said snubber wherein the flow is restricted to a predetermined rate thereby precluding operation of the airfoil at a speed in excess of said rate by any external means or forces.

6. In an airplane control system including a movable airfoil, manually operable means for controlling the said airfoil, and hydraulic and linkage means for multiplying the manual energy and for governing the speed of control, the second said means comprising a pivotal lever spaced from said movable airfoil and a hydraulic valve, piston, and snubber unit floatingly suspended therebetween, a linkage connecting said manual means with the valve and a rod connecting said manual means with said pivotal lever, whereby operation of said manual means reciprocates the said valve, thereby directing fluid pressure from a fluid supply to the said piston which is displaced and transmits force to the airfoil consequently rotating same, the speed of such rotation being governed by the passage of fluid from the piston as same is displaced, said fluid flowing through the said snubber wherein the flow is restricted to a predetermined rate thereby precluding operation of the airfoil at a speed in excess of said rate either by the manual control means or by external forces acting on the airfoil.

7. In an airplane control system including a movable airfoil, manually operable means for controlling the said airfoil, and hydraulic and linkage means for multiplying the energy exerted by the said manual means, the second said means comprising a pivotal lever spaced from said movable airfoil and a hydraulic valve and piston unit suspended therebetween, a linkage connecting said manual means, the valve and the pivotal lever whereby operation of said manual means reciprocates the said valve thereby directing pressure fluid from a fluid supply to the said piston which is displaced and transmits force both to the airfoil and the pivotal lever, the force to the airfoil rotating same and the force to the lever being transmitted through the linkage to the manual control means, the linkage being so organized and arranged that the force transmitted therethrough is a sub-multiple of the force rotating said airfoil, the multiple ratio between the two forces being variable by changing the arrangement of the linkage means with respect to the pivotal lever and the hydraulic piston.

8. In an airplane control system including a movable airfoil, manually operable means for controlling the said airfoil, and hydraulic and linkage means for multiplying the manual energy and for governing the speed of control, the second said means comprising a pivotal lever spaced from said movable airfoil and a hydraulic valve, piston and snubber, the piston being floatingly suspended between said lever and said airfoil, a linkage connecting said manual means with the valve and piston and a rod connecting said manual means with said pivotal lever, whereby operation of said manual means reciprocates the said valve, thereby directing fluid pressure from a fluid supply to the said piston which is displaced and transmits force both to the airfoil and the pivotal lever, the force to the airfoil rotating same and the force to the lever being transmitted therethrough to the rod connected to the manual control means, the rod and linkage being so arranged that the force transmitted to the airfoil is a multiple of the force transmitted through the manual control means, the multiple ratio between the two forces being variable by changing the position of the rod with respect to the pivotal lever and the hydraulic piston, and the speed of operation of the airfoil being governed by the passage of fluid from the piston as same is displaced, said fluid flowing through the said snubber wherein the flow is restricted to a predetermined rate thereby precluding operation of the airfoil at a speed in excess of said rate by any external means or forces.

9. In an airplane control system, a movable airfoil and a gust dampening means for said airfoil, said means comprising a hydraulic piston having control means actuatable by excess force applied to said piston to limit the movement thereof, and linkage mechanism both of which are connected to said airfoil in a manner such that forces resulting from wind gusts acting on said airfoil actuate said control means are snubbed by said hydraulic piston and reduced in energy by said linkage mechanism, the amount of energy reduction being variable from a predetermined minimum to infinity by changing the arrangement of said linkage with respect to said piston.

10. In an airplane control system, an airfoil, means to manually control said airfoil, a hydraulic piston and linkage actuated by the first said means to multiply the manual energy, and an adjustable lever cooperative with the said piston and linkage to vary the multiple.

11. In a power control for an airfoil, the combination of: pilot operated control means having a part movable through consecutive positions within a prescribed range; a member connected to the airfoil whereby movement may be transmitted to the airfoil, said member being positioned so as to have movement relative to said movable part of said control means; power means for moving said member whereby movement of said airfoil is accomplished; a control element for said power means connected to said part and to said member so that movement of said part relative to said member will actuate said control element to effectuate operation of said power means which will move said member in a direction to follow the movement which has been imparted to said part; and means disposed in series with said power means operating automatically to transmit to said control means a reaction proportionate to the force transmitted at any time through said member to move said airfoil.

12. In a power control for an airfoil, the combination of: pilot operated control means movable through selected arcs of movement within a prescribed range of movement; a motor operated in consequence of the movement of said control means to move said airfoil, said motor having a movable active part connected to said airfoil and a movable reactive part; and a linkage mechanism connecting said reactive part of said motor to said control means whereby the force and extent of the reactive movement of said motor will be transmitted to said control means.

13. In a power control for an airfoil, the combination of: pilot operated control means movable through selected arcs of movement within a prescribed range of movement; a motor operated in consequence of the movement of said control means to move said airfoil, said motor having a movable active part connected to said airfoil and a movable reactive part; and link means connecting said reactive part of said motor to said control means whereby a fraction of the force and extent of the reactive movement of said motor will be transmitted to said control means.

14. In a power control for an airfoil, the combination of: an operating member connected to said airfoil whereby the same may be moved; a pilot operated member mounted for operative movement; a force multiplying mechanism connected to said pilot operated member and having a part moving in accordance with the movement of said pilot operated member, through a distance which is a fraction of the movement of said pilot operated member and with a force which is a multiple of the force applied to said pilot operated member; and means connecting said part of said mechanism to said operating member of said airfoil and transmitting said force to said airfoil operating member, said last named means including a motor arranged to multiply the movement of said part of said mechanism and transmit to said airfoil operating member a multiple of the movement of said part.

15. In a power control for an airfoil, the combination of: an operating member connected to said airfoil whereby the same may be moved; a pilot operated member mounted for operative movement; force multiplying means connected to said pilot operated member, having a part moving in accordance with the movement of said pilot operated member, through a distance which is a fraction of the movement of said pilot operated member and with a force which is a multiple of the force applied to said pilot operated member; and a power strut connecting said part to said operating member of said airfoil, said power strut having means operating to automatically change the length thereof as said part moves so that the movement transmitted by said power strut to said operating member will be a multiple of the movement of said part and proportionate to the movement of said pilot operated member.

16. In a power control for a movable airfoil, the combination of: an operating member connected to said airfoil whereby the same may be moved; a pilot controlled member mounted for operative movement; a force multiplying lever linked to said pilot controlled member and having a part moving in response to movement of said pilot controlled member, through a distance which is a fraction of the movement of said pilot controlled member and with a force which is a multiple of the force applied to said pilot controlled member, and means connecting said part of said lever to said airfoil operating member and transmitting said force thereto, said last named means including a motor arranged to multiply the extent of movement of said part of said lever and to transmit to said airfoil operating member a multiple of the movement of said part.

17. In a control of the character described whereby a member may be moved by power without sacrificing sense of load-feel on the part of the operator, the combination of: a part moved by the operator; means connecting said part to said member so that movement of said part produces a movement of said member; power means connected to said member so as to impart to said member, in addition to said movement, a supplementary movement so that the displacement of said member will include the movement of said part and said supplementary movement; and means to correlate the operation of said power means with the movement of said part.

18. In a control of the character described whereby a member may be moved by power without sacrificing sense of load-feel on the part of the operator, the combination of: a part moved by the operator; means connecting said part to said member so that movement of said part produces a movement of said member; power means connected to said member so as to impart to said member, in addition to said movement, a supplementary movement so that the displacement of said member will include the movement of said part and said supplementary movement; means to correlate the operation of said power means with the movement of said part; and a lost motion connection between said part and said member whereby motion may be transmitted to said member in event of failure of said power means.

19. A combination manual and power control for an aircraft comprising: a manually operable member; a movable airfoil; a train of power transmitting devices between said member and airfoil for delivering the manual energy of the pilot to the airfoil to move it, including two devices having a lost-motion power transmitting connection therebetween; a second train of power transmitting devices between said two devices including a hydraulic strut arranged when energized to power multiply the manual force delivered thereto, said second train being also arranged to deliver the manual energy of the pilot to the airfoil to move it in the same sense as said first train; and a valve for the two way energization of said strut and movable from neutral for said energizations in response to movement of said lost motion connection from a midway position toward its two extreme positions respectively.

EDWARD F. BURTON.
HAROLD W. ADAMS.
ORVILLE A. WHEELON.